US008032033B2

(12) United States Patent
Binkert et al.

(10) Patent No.: US 8,032,033 B2
(45) Date of Patent: Oct. 4, 2011

(54) SYNCHRONOUS OPTICAL BUS PROVIDING COMMUNICATION BETWEEN COMPUTER SYSTEM COMPONENTS

(75) Inventors: Nathan Binkert, Redwood City, CA (US); Norm Jouppi, Palo Alto, CA (US); Robert Schreiber, Palo Alto, CA (US); Jung Ho Ahn, Palo Alto, CA (US); Moray McLaren, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 928 days.

(21) Appl. No.: 11/977,369

(22) Filed: Oct. 23, 2007

(65) Prior Publication Data

US 2009/0103929 A1    Apr. 23, 2009

(51) Int. Cl.
*H04B 10/20* (2006.01)
(52) U.S. Cl. ............... 398/155; 398/164; 398/168
(58) Field of Classification Search .......... 398/154–155, 398/164, 168
See application file for complete search history.

(56) References Cited

U.S. PATENT DOCUMENTS

| 5,790,287 A * | 8/1998 | Darcie et al. ............ 398/108 |
| 6,301,637 B1 * | 10/2001 | Krull et al. ............ 711/112 |
| 6,396,604 B1 * | 5/2002 | Smith et al. ............ 398/99 |
| 7,099,278 B2 * | 8/2006 | Momtaz ............ 370/249 |
| 2006/0029394 A1 * | 2/2006 | Furuyama ............ 398/79 |
| 2007/0053692 A1 * | 3/2007 | Hoshida et al. ............ 398/97 |

* cited by examiner

*Primary Examiner* — Leslie Pascal

(57) ABSTRACT

A synchronous optical bus system for communication between computer system components is described. In one example, the optical bus system is used for communication between a memory controller and memory devices optically coupled to an optical interconnect. Optical bus interface units couple the components to the optical interconnect and are arranged on the optical interconnect in order that a sum of an optical path length from a controller component to each computer system component and from each computer system component to the controller component is the same for all the coupled computer system components. A synchronous protocol is used for communication between the components.

15 Claims, 6 Drawing Sheets

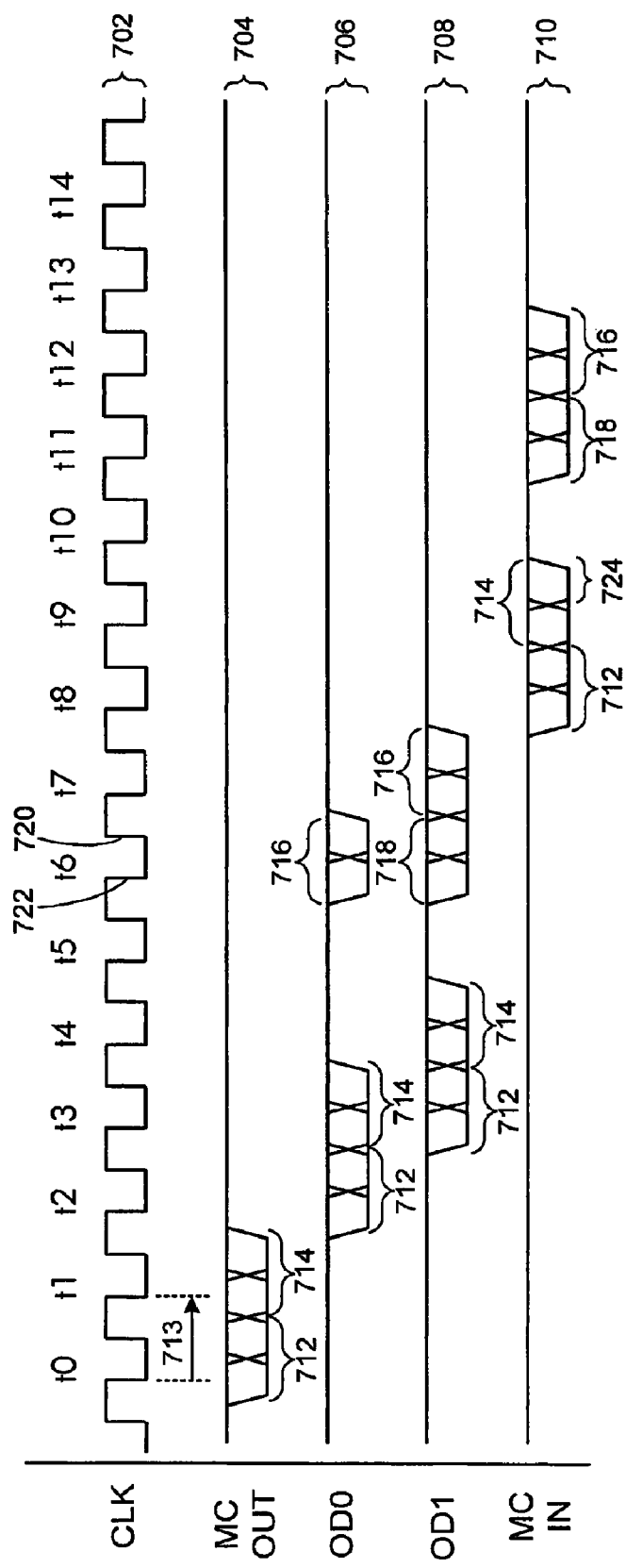

SYNCHRONOUS OPTICAL BUS PROVIDING COMMUNICATION BETWEEN COMPUTER SYSTEM COMPONENTS

TECHNICAL FIELD

The present invention relates generally to optical computer system buses, and more particularly to optical memory buses.

BACKGROUND ART

Electrical communication architectures struggle to balance the dichotomy for increased performance required of electronic systems while addressing lower power consumption, smaller form factor, and lower electromagnetic emissions. Better solutions dealing with address scalability while reducing power consumption in computer systems are desirable. A memory system is an example of a typical computer system in which such better solutions are desirable.

The increasing speed of microprocessors requires a corresponding increase in memory bandwidth. The ability to increase available memory bandwidth is constrained by two factors; the number of signal pins available on the processor package; and the speed at which these pins can be driven. The number of available pins is not increasing substantially as this increases both the cost of the package, and the power consumption of the processor. Increasing the per pin speed also increases power consumption.

At the same time the signal integrity problems of high speed electrical signaling mean that less memory devices can be put onto a memory bus as its speed increases. For example, DDR2 and DDR3 memory systems make use of a return data strobe, in order to accurately sample the data being returned from the memory at high speed. However as previously noted, increasing speed reduces the number of memory devices that can be put on the same bus, to the extent that at the maximum DDR3 data rate, only a single memory DIMM is supported. FBDIMM memory systems allow a higher data rate per pin, by using an architecture based on point to point links. Because data and commands have to be forwarded between multiple point to point links, the latency of memory operations grows as more DIMMs are added to the memory system. Additional power is consumed since commands and data have to be retransmitted across multiple point to point hops.

Optical interconnects are available to be used as alternatives to electrical interconnects. Other proposed optical interconnects are between processor and memory in point-to-point configurations. In this arrangement, each channel commonly carries its own timing information by using encoding schemes that insure a high rate of transitions. However, this architecture does not scale well. For example in a memory sub-system with point-to-point connections, the number of transceivers and associated power dissipation would increase due to the increased number of optical interconnects needed to connect all the components.

A low power optical bus providing communication between computer system components which provides high bandwidth access to multiple memory devices is desired.

SUMMARY

The present invention provides one or more embodiments of a synchronous optical bus system for providing communication between computer system components. The optical bus system comprises an optical interconnect which provides an optical data communication path for computer system components optically coupled to it. In one embodiment, each component is optically coupled via an optical bus interface unit to the optical interconnect, and the optical bus interface units are arranged on the optical interconnect in order that a sum of an optical path length from a controller component to each computer system component and from each computer system component to the controller component are equivalent for all the coupled computer system components. Additionally, communication between the controller component and the other components is performed in accordance with a synchronous protocol. In one embodiment, the controller component is a memory controller, and the other components coupled to the optical interconnect are memory devices.

The present invention also provides one or more embodiments of a method of communication between computer system components over an optical bus in accordance with a synchronous protocol.

Certain embodiments of the invention have other aspects in addition to or in place of those mentioned or obvious from the above. The aspects will become apparent to those skilled in the art from a reading of the following detailed description when taken with reference to the accompanying drawings.

BRIEF DESCRIPTION OF THE DRAWINGS

FIGS. 7A and 7B are illustrative views of exemplary timing diagrams for a synchronous protocol of the memory system of FIG. 2.

DETAILED DESCRIPTION

Figure 1:
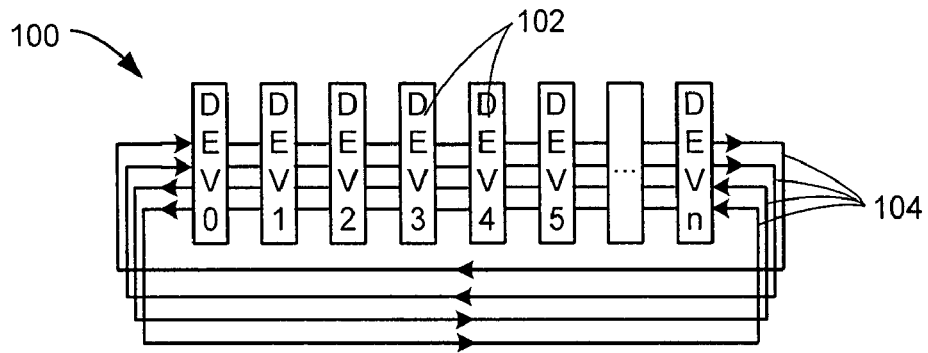
FIG. 1 is a block diagram view of a computer system in which a plurality of components are coupled via a synchronous optical bus system in accordance with an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail. Likewise, the drawings showing embodiments of the system are semi-diagrammatic and not to scale and, particularly, some of the dimensions are for the clarity of presentation and are shown greatly exaggerated in the drawing FIGs. Generally, the invention can be operated in any orientation.

In addition, where multiple embodiments are disclosed and described having some features in common, for clarity and ease of illustration, description, and comprehension thereof, similar and like features one to another will ordinarily be described with like reference numerals. The embodiments have been numbered first embodiment, second embodiment, etc. as a matter of descriptive convenience and are not intended to have any other significance or provide limitations for the present invention.

Referring now to FIG. 1, therein is shown a block diagram view of a computer system in which a plurality of components are coupled via a synchronous optical bus system in accordance with an embodiment of the present invention. The block diagram depicts devices 102 communicating through an optical interconnect 104. An optical interconnect provides one or more optical data communication paths. Optical interconnect 104 can be implemented in a number of ways. For example, a single waveguide can comprise one or more wavelengths or optical channels. In another example, the interconnect 104 can be implemented as a plurality of waveguides, and each waveguide includes one or more optical channels or wavelengths. Examples of optical waveguides include polymeric, glass, or light pipes including hollow metal waveguides.

Examples of the devices 102 include central processing unit integrated circuits, a subsystem board having integrated circuits, memory devices, or interface integrated circuits. Also for example, each device 102 or a portion thereof can include an intra-chip optical interconnect, an electrical interconnect, or a combination thereof. As another example, the devices 102 may be different from one another and all the devices 102 may not necessarily perform substantially the same type of function or may not be implemented with substantially the same technology.

In the illustrated example, the optical interconnect 104 provides bi-directional communication in a loop configuration between the devices 102 that are optically coupled to the interconnect 104. The bi-directional communication in optical interconnect 104 is implemented in this example with sets of unidirectional optical paths providing communication in opposite directions. In one example, the optical paths can be implemented as separate waveguides. One of the devices 102 can communicate with another of the devices 102 that is not adjacent to it by the other devices 102 passing the received information along a respective direction in the optical interconnect 104.

The optical interconnect 104 can also provide bi-directional communication in a loop configuration between the devices 102 through a single waveguide having a plurality of optical channels traveling in opposite directions. This is done through the use of different colors or wavelengths with one or more predetermined wavelengths used for transmitting and a further one or predetermined wavelengths used for receiving. The transmitting and receiving for one of the devices 102 represents communication in opposite direction. The optical path lengths in each direction of the optical interconnect 104 are substantially the same length minimizing timing skew between the optical channels for each direction.

For illustrative purposes, the computer system 100 is shown having the optical interconnect 104, although it is understood that the computer system 100 may have other interconnects, such as electrical. Also for illustrative purposes, the computer system 100 is shown having the devices 102, although it is understood that the computer system 100 may have other components (not shown) or parts (not shown) that may be connected or not connected to the optical interconnect 104. Further for illustrative purposes, all the devices 102 are shown connected in a loop configuration with the optical interconnect 104, although it is understood that the optical interconnect 104 may include other communication links (not shown), such as sub loops, between the devices 102.

Figure 2:
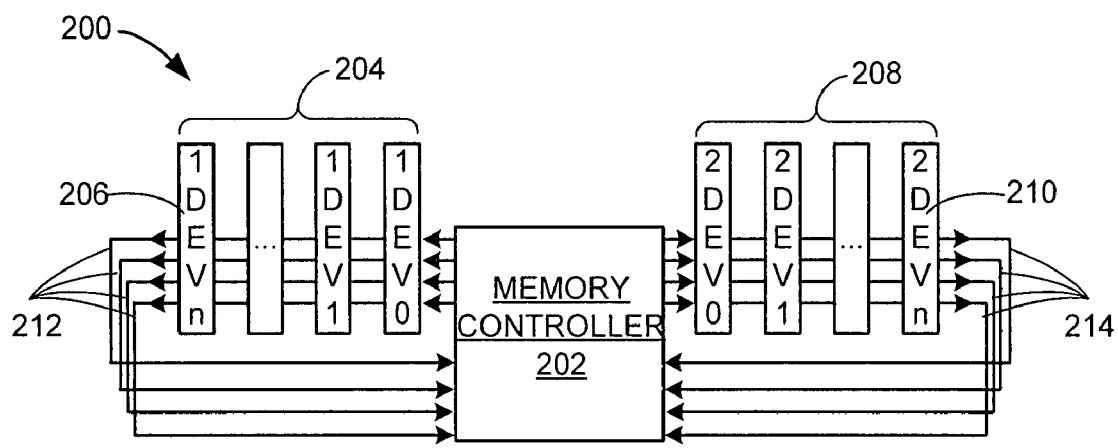
FIG. 2 is a block diagram view of a memory system communicating via a synchronous optical bus system in accordance with an embodiment of the present invention

As noted above, an example of a computer system which can use the synchronous optical bus in accordance with an embodiment of the invention is a memory system. Referring now to FIG. 2, therein is shown a block diagram view of a memory system communicating via a synchronous optical bus system 200 in accordance with an embodiment of the present invention.

The memory system 200 includes a memory controller 202 connected to a first memory channel 204 of first optically-connected memory devices 206 (referred to also as first optical memory devices) and a second memory channel 208 of second optically-connected memory devices 210 (referred to also as second optical memory devices). The memory controller 202 may be included in an integrated circuit having other functions, such as a processor, or may interface to other integrated circuits (not shown), or a combination thereof. The memory controller 202 also performs electrical to optical (E/O) and optical to electrical (O/E) conversions.

The first memory channel 204 includes a first optical interconnect 212 for communication from the memory controller 202 to and through the first optical memory devices 206 and back to the memory controller 202. Each channel of the first optical interconnect 212 traverses the same optical path length as another channel within a predetermined tolerance from the memory controller 202 to and through the first optical memory devices 206 and back to the memory controller 202. This similarity of optical path length allows for the same latency between each of the first optical memory devices 206 and the memory controller 202. For example, the furthest of the first optical memory devices 206 from the memory controller 202 has the shortest optical path back to the memory controller 202 while the closest of the first memory devices 206 from the memory controller 202 has the longest optical path back equalizing the latency.

In this illustrated example, the first optical interconnect 212 starts from the memory controller 202, couples the memory devices 206, and loops back to the memory controller 202. The memory controller 202 transmits to all the first optical memory devices 206 and can sense that the transmission is complete. The loop back allows the memory controller 202 to listen or monitor on the same channels of the first optical interconnect 212 for one of the first optical memory devices 206 to respond back. The latency from each of the first optical memory devices 206 is the same or similar within a predetermined tolerance with the communication from and back to the memory controller 202 traversing the length of the first optical interconnect 212.

Further, the loop configuration of the first optical interconnect 212 may provide fault detection features for the optoelectronic system 200. For example, the memory controller 202 may sense a fault by monitoring the return power in the first optical interconnect 212. The fault sensing also applies for the single channel, dual wavelength configuration where one wavelength is used for transmitting over the first optical interconnect 212 and another wavelength is used for receiving. For the dual wavelength implementation example, the memory controller 202 can be in transmit and receive mode since the wavelength defines transmit or receive thereby potentially increasing the throughput by two times.

Similarly, the second memory channel 208 includes a second optical interconnect 214 for communication from the memory controller 202 to and through the second optical memory devices 210 and back to the memory controller 202. The functions, attributes, and features described for the first memory channel 204 and the first optical interconnect 212 apply to the second memory channel 208 and the second optical interconnect 214. For illustrative purposes, the second memory channel 208 depicts the same number of the second optical memory devices 210 as the first optical memory devices 206 in the first memory channel 204, although it is understood that the first memory channel 204 and the second memory channel 208 may have any number of memory devices and may not be of the same number of memory devices.

The memory system 200 may utilize the first memory channel. 204 and the second memory channel 208 in a number of ways. For example, the first memory channel 204 and the second memory channel 208 may provide cumulative memory capacity, provide striped memory for added performance, or provide redundant and fail-over memory for a fault tolerant memory architecture.

The first optical memory devices 206 and the second optical memory devices 210 can connect with devices for performing optical to electrical (O/E) conversion and vice versa and provide means for coupling the optical signal to the first optical interconnect 212 and the second optical interconnect 214, respectively. The first optical memory devices 206 and the second optical memory devices 210 may optionally include circuits for performing optical to electrical (O/E) conversion and vice versa.

Figure 3:
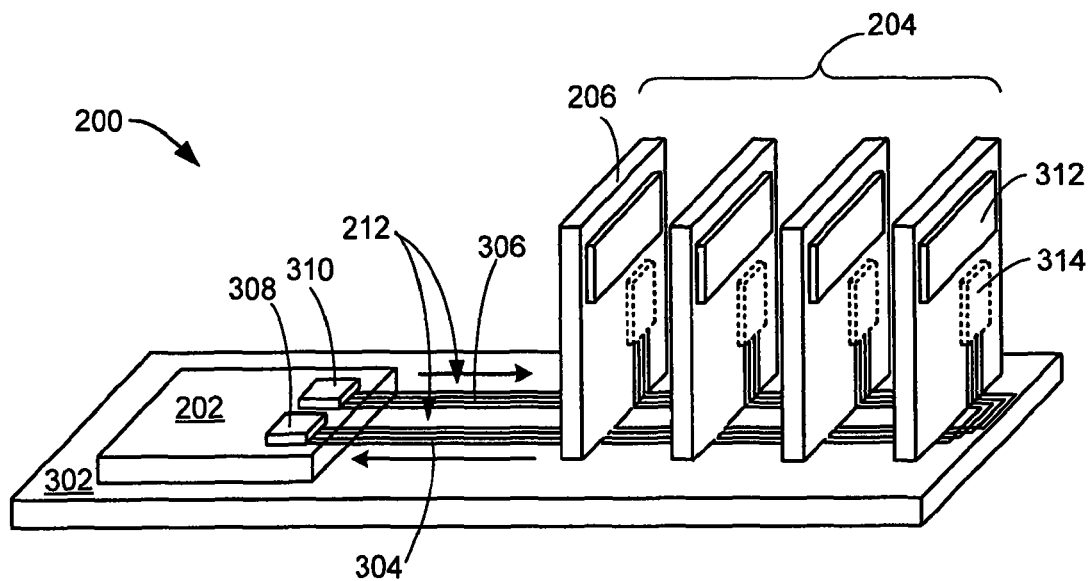
FIG. 3 is an isometric view of a portion of the memory system of FIG. 2 in accordance with an embodiment of the present invention.

Referring now to FIG. 3, therein is shown an isometric view of a portion of the memory system 200 of FIG. 2. The isometric view depicts the memory controller 202 mounted over a carrier 302, such as a printed circuit board. The memory controller 202 connects with the first optical memory devices 206 of the first memory channel 204 through the first optical interconnect 212. For illustrative purposes, the isometric view depicts the first memory channel 204, although it is understood that the isometric view may depict the second memory channel 208.

As mentioned in FIG. 2, the first optical interconnect 212 provides the communication from the memory controller 202 to and through the first optical memory devices 206 and back to the memory controller 202. The first optical interconnect 212 includes ingress optical interconnects 304, such as a northbound optical interconnects, and egress optical interconnects 306, such as southbound optical interconnects. The "ingress" and "egress" terms are relative to the memory controller 202. The ingress optical interconnects 304 carry information, such as clock, command, data, or status, towards the memory controller 202. The egress optical interconnects 306 carry information, such as clock, command, data, or status, from the memory controller 202.

For illustrative purposes, the memory system 200 is described with the first optical interconnect 212 providing the communication with the ingress optical interconnects 304 and the egress optical interconnects 306, although it is understood that the first optical interconnect 212 may provide the communication without dedicating the ingress portion and the egress portion of the first optical interconnect 212 for communication in each direction.

For example, the first optical interconnect 212 may provide the communication between the first optical memory devices 206 and the memory controller 202 using the same optical path for both "ingress" and "egress" optical communication. This is achieved with predetermined optical wavelengths with one or more of the predetermined wavelengths used for "ingress" communication and a further one or more of the predetermined wavelengths used for "egress" communication.

As an example, the memory controller 202 includes electrical interconnects (not shown) such that the memory controller 202 performs optical to electrical (O/E) and electrical to optical (E/O) conversions. The memory controller 202 includes a controller photo-detector 308, such as a photo-diode, connected with the ingress optical interconnects 304 and a controller light source 310, such as a laser diode, light emitting diodes (LEDs), vertical cavity surface emitting laser (VCSELs), a single mode laser, or a mode locked laser, connected to the egress optical interconnects 306. For illustrative purposes, the memory controller 202 is described performing O/E and E/O conversions at its interface to the first optical interconnect 212, although it is understood that the memory controller 202 may provide an optical connection with the first optical interconnect 212 without performing the conversions, such as through integrated optics.

For illustrative purposes, the first optical memory devices 206 are shown as plug-in cards connected to the carrier 302 establishing connections with the ingress optical interconnects 304 and the egress optical interconnects 306, although it is understood that the first optical memory devices 206 may not be plug-in cards and may be mounted onto the carrier 302.

Each of the first optical memory devices 206 includes memory devices 312, wherein the memory devices 312 are coupled to an optical bus interface unit 314, in this example context, an optical memory bus interface unit 314. The optical memory bus interface unit 314 is depicted by dotted lines signifying that the optical memory bus interface unit 314 may not be included in the first optical memory devices 206 but connect to the first optical memory devices 206.

Figure 4:
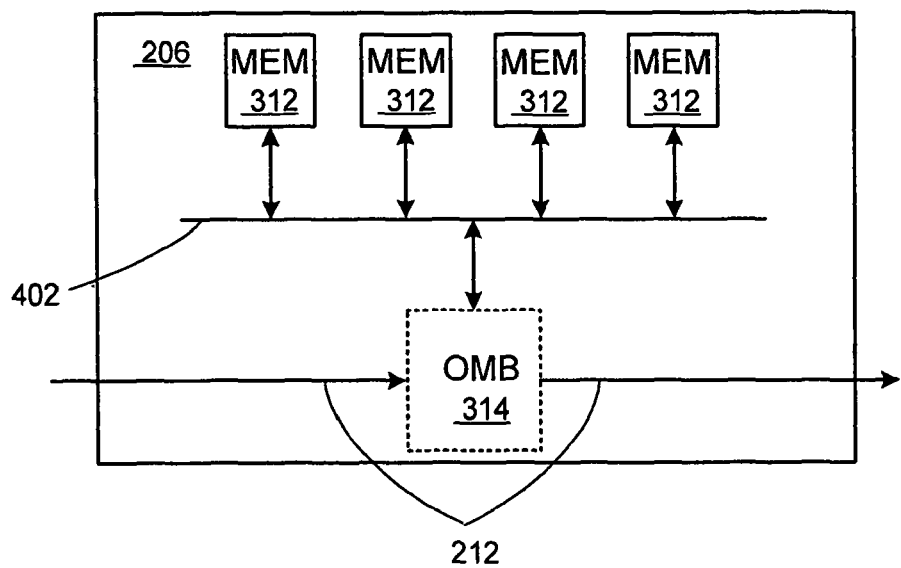
FIG. 4 is a block diagram view of one of the first optical memory devices of FIG. 3 for use within one or more embodiments of the present invention.

Referring now to FIG. 4, therein is shown a block diagram view of one of the first optical memory devices 206 of FIG. 3. A memory bus 402, such as an electrical memory bus, connects the memory devices 312 and the optical memory bus interface unit 314 in each of the first optical memory devices 206. As noted before, the optical memory bus interface unit 314 is depicted by a dotted square signifying that its location may not be included with the first optical memory devices 206. Optical channels traveling on the optical interconnect 212 are split at each optical memory bus interface unit 314 so that they are both diverted for optical to electrical conversion by the interface unit 314 and passed through in optical form on the optical interconnect 212.

The memory devices 312 may include a number of memory technologies. For example, the memory devices 312 may include volatile random access memory (RAM) such as dynamic random access memory (DRAM) or static random access memory (SRAM). As another example, the memory devices 312 may include non-volatile memory such as non-volatile random access memory (NVRAM) or read only memory (ROM).

Figure 5:
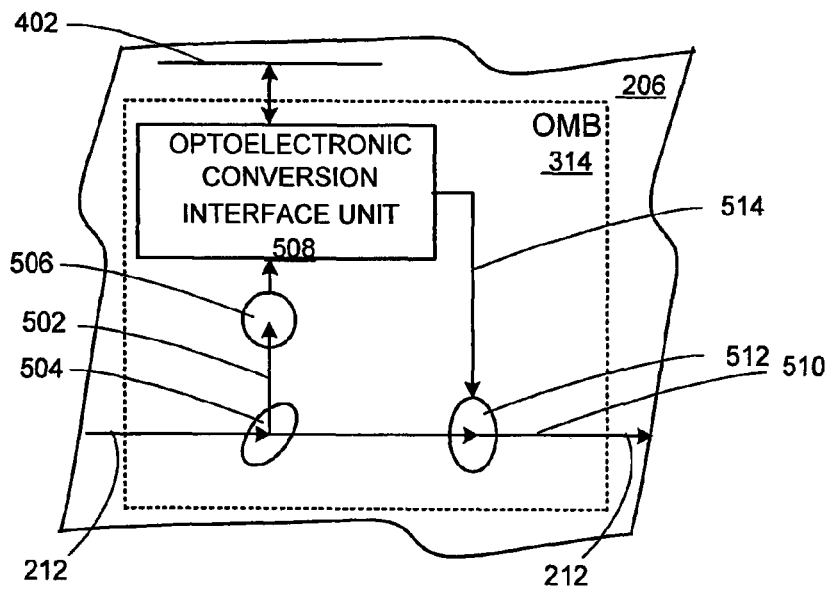
FIG. 5 is a block diagram view of the optical memory bus interface unit of FIG. 3 in accordance with an embodiment of the present invention.

Referring now to FIG. 5, therein is shown a block diagram view of the optical memory bus interface unit 314 of FIG. 3. As mentioned earlier, the optical memory bus interface unit 314 connects to the memory bus 402 of the first optical memory devices 206. Light from the memory controller 202 of FIG. 3 enters the optical memory bus interface unit 314 and an optical tap 504 splits off a portion, hereafter referred to as a diverted light 502 while the remainder of the light continues on the optical interconnect 212. Preferably, a passive optical splitter, (for example a beam splitter) is used.

The diverted light 502 is transmitted to one or more optical to electrical (O/E) converters 506 (e.g., a photo-detectors)

which sends the electrical signals (e.g., clock and data) to an optoelectronic conversion interface unit 508. The optoelectronic conversion interface unit 508 has some logic for reading the clock and commands from the memory controller 202 and connects with the memory bus 402 for accessing the appropriate memory devices 312.

If data is read from the memory devices 312 of FIG. 4, the data is sent over the memory bus 402 to the optoelectronic conversion interface unit 508. The optical modulator 512 is electronically controlled by the optoelectronic conversion interface circuitry 508 to encode or modulate the electrical read data 514 on to an unmodulated channel on the optical interconnect 212, the unmodulated channel being generated by a light source on the memory controller 202. Read optical signals 510 are output onto the optical interconnects 212 to be sent back to the memory controller 202. The read optical signals 510 include converted read data from the memory devices 312. The optical modulator 512 may be designed in a number of ways, such as a Mach-Zehnder interferometer, a ring modulator and filter, a resonance-assisted modulator, a frequency agile modulator, a resonant cavity design, or a combination thereof.

In this embodiment, the memory controller 202 sends the clock signal on a channel and also sends both modulated and unmodulated signals on the data channels. The modulated signals have encoded information on them for the memory devices. In one implementation example, the memory controller encodes data on a signal sent on a data channel followed by unmodulated light on the same data channel or another channel if desired. The memory device 206 providing the response data can modulate the unmodulated signal under electronic control to provide the data back to the memory controller. Thus, each of the memory devices does not need its own light source for creating an optical signal. Only the memory controller need have a light source for generating optical signals.

Figure 6:
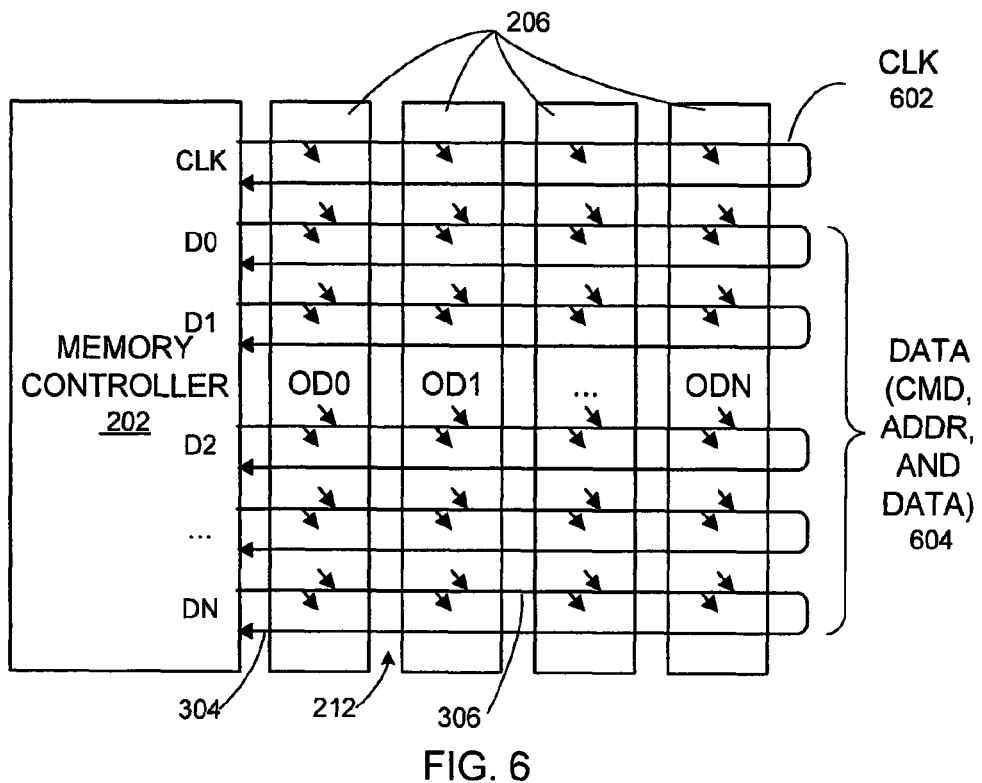
FIG. 6 presents a view of the memory system embodiment of FIG. 2 illustrating clock and data channels in accordance with an example of the present invention.

FIG. 6 presents a view of the memory system embodiment of FIG. 2 illustrating clock and data channels in accordance with an example of the present invention.

FIG. 6 illustrates the memory controller 202 with a clock signal labeled CLK which is transmitted on a clock optical channel 602 by the controller 202 as well as various data channels 604 D0 to DN for carrying data signals including such data items as read and write requests. The data channels are optically coupled to channels of the optical interconnect 212. The memory controller 202 transmits or multi-casts information, such as clock, command, data, or status, over the optical interconnects 212 to the first optical memory devices 206. The first optical memory devices 206 drive data onto the data channels 604 responsive to requests from the memory controller 202 based on the memory controller's generated clock CLK carried an the clock optical channel 602. At the furthest of the first optical memory devices 206 illustrated by ODN from the memory controller 202, the first optical interconnect 212 continues back to the memory controller 202. The combined optical path length of the first optical interconnect 212 for each of the first optical memory devices 206 from the memory controller 202 and back to the memory controller 202 is equivalent within a predetermined tolerance. The clock channel also travels the same optical interconnect 212 path length as a data signal sent from the memory controller.

The memory controller 202 communicates with the first optical memory devices 206 using a synchronous protocol. Each first optical memory device 206 determines when to sample the address and control data channels based on the clock signal CLK from the memory controller. The memory controller 202 receives a request for data from a component external to the memory system. The memory controller 202 has a memory map with information identifying the positions of the memory devices 206 on the optical interconnects 212.

Some variation between the timing of the first optical memory devices 206 may exist. For example, the propagation delay varies from device to device. This device to device skew may be caused by process variations between individual devices, such as by temperature variations and voltage variations. The return clock signal over the clock channel 602 compensates for these variations.

The synchronous protocol is sometimes referred to as a source synchronous protocol as the clock is sent by the source of the data request. For example, if the memory controller 202 performs a read operation with the read command, the read address, or a combination thereof transmitted over the data channel 604, then the memory controller 202 also transmits the source clock over the clock channel 602 synchronous to the read command or read address. Any device connected to the first optical interconnect 212 modulates an unmodulated light signal sent from the memory controller for driving information over the first optical interconnect 212. As in this example, the memory controller 202 modulates light as it transmits clock and data. If the memory controller 202 is not transmitting, it provides unmodulated light over the first optical interconnect 212. The first optical memory devices 206 samples the read information carried over the data channel 604 with the source clock carried over the clock channel 602.

In response to the read operation, one of the first optical memory devices 206, as an example, matching its assigned memory map in the memory system 200 of FIG. 2, responds by placing read data over the data channel 604 by modulating light over the data channel 604. The read data is placed over the data channel 604 based on the clock from the memory controller 202. The read data may be placed over the data channel 604 after some memory access delay, onto the return optical data path continuing on the first optical interconnect 212. The read data may be sent over the data channel 604 at the clock rate of the memory controller 202. As mentioned earlier, the memory controller 202 may be included in a device having other functions, such as the main processor.

The return path from the first optical memory devices 206 to the memory controller 202 is arranged that the sum of the optical path lengths from the memory controller 202 to each of the first optical memory devices 206 and from each of the first optical memory devices 206 to the memory controller 202 is the same for all of the first optical memory devices 206. This insures that the read data carried over the first optical interconnect 212 to the memory controller 202 appears with similar timing at the interface of the memory controller 202 no matter which one of the first optical memory devices 206 is being read. The timing of the data signals on the different parallel channels relative to the clock within a given packet is uniform no matter from which memory device 206 data is being read.

The memory controller 202 is reading data from multiple memory devices on a common bus and must know accurately the correct point at which to sample the data. Any inaccuracy in the sample point shrinks the size of the data eye, and hence limits the data rate. Optionally, for each read data bit driven onto the data channel 604 by a memory device 206, the memory device 206 can drive a return data strobe which can be toggled to indicate to the controller 202 the correct position to sample the data.

Referring now to FIG. 7A, therein is shown an illustrative view of an exemplary timing diagram for a source synchronous optical protocol 700 of the memory system 200 of FIG. 2. The timing diagram is an example of a source synchronous protocol 700 with the memory controller 202 of FIG. 6 reading from the two closest of the first optical memory devices 206 of FIG. 6 to the memory controller 202.

The timing diagram depicts a source clock 702 labeled as "CLK", controller output 704 from the memory controller 202 labeled as "MC OUT", first location information 706 at the closest of the first optical memory devices 206 labeled as "OD0" and second location information 708 at the next closest of the first optical memory devices 206 labeled as "OD1", and controller input 710 into the memory controller 202 labeled "MC IN". The "CLK" is carried over the clock channel 602 of FIG. 6. The "MC OUT", "OD0", "OD1", and "MC IN" are carried over the data channels 604 of FIG. 6.

In this example, the memory controller 202 issues a first read operation 712 and a second read operation 714 shown on the "MC OUT" timing diagram to "OD1 " and "OD0", respectively. The first read operation 712 on "MC OUT" includes both a read command and a read address at the clock cycle labeled "t0" of the "CLK" timing diagram. The second read operation 714 on "MC OUT" includes both a read command and a read address at the clock cycle labeled "t1" of the "CLK" timing diagram. A time delta 713 of one clock cycle, as an example, is shown between the first read operation 712 and the second read operation 714.

The first read operation 712 reaches "OD0" shown on the "OD0" timing diagram at the clock cycle "t2" of the "CLK" timing diagram. However, the memory device "OD0" doesn't modulate the channel since the read operation 712 doesn't target the device. The second read operation 714 reaches "OD0" shown on the "OD0" timing diagram at the clock cycle "t3" of the "CLK" timing diagram. Since this operation targets the memory device "OD0", the device modules the channel with read data 716 (shown on the "OD0" timing diagram at the clock cycle "t6" of the "CLK" timing diagram) after three cycles.

The first read operation 712 reaches "OD1" shown on the "OD1" timing diagram at the clock cycle "t3" of the "CLK" timing diagram. The second read operation 714 reaches "OD1" shown on the "OD1" timing diagram at the clock cycle "t4" of the "CLK" timing diagram. The memory device "OD1" responds to the first read operation 712 modulating the channel with read data 718 (shown on the "OD1" timing diagram at the clock cycle "t6" of the "CLK" timing diagram) after three cycles. Read data 716 modulated from "OD0" is shown on the "OD1" timing diagram at the clock cycle "t7" of the "CLK" timing diagram.

The first read operation 712 and the second read operation 714 return to the memory controller 202 shown on the "MC IN" timing diagram at the clock cycle "t8" and "t9" of the "CLK" timing diagram, respectively. The read data 716 and 718 are shown on the "MC IN" timing diagram at the clock cycle "t12" and "t11" of the "CLK" timing diagram, respectively.

As mentioned earlier, the total path over the first optical interconnect 212 from the memory controller 202 to the each of the first optical memory devices 206 and from each of the first optical memory devices 206 to the memory controller 202 is the same. Although the "OD0" is closer than "OD1" to the memory controller 202 in the egress direction, if the memory being read on both OD0 and OD1 has the same latency (like illustrated above) the first read data 716 and the second read data 718 will reach the memory controller 202 with the same latency from the transfer issued by the memory controller 202.

Figure 7B:
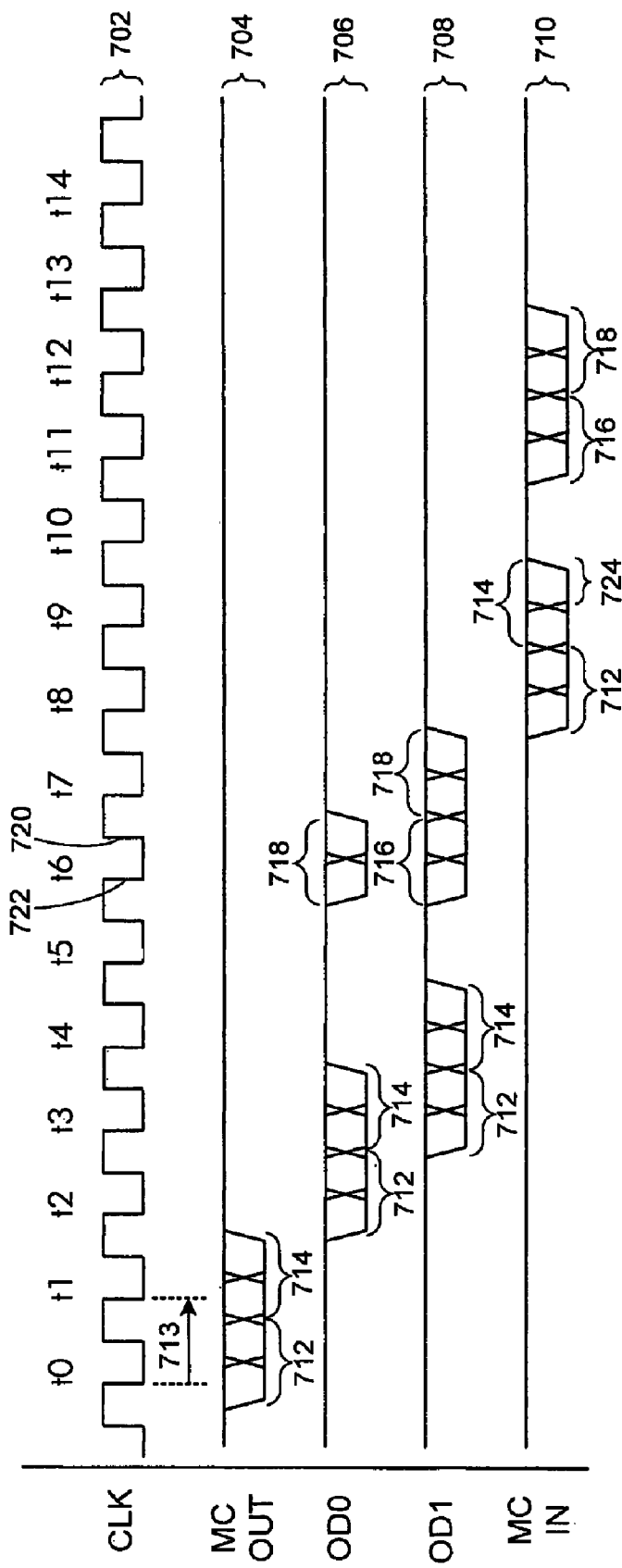

Memory devices often have different latencies for accessing different addresses at different times. Examples of this include if the memory device requires only a CAS access or a longer RAS+CAS access, and whether there are bank conflicts caused by other accesses. FIG. 7B also illustrates the case where accessing the required data from "OD1" has a latency that is two cycles less than that of accessing the needed data from "OD0" (2 versus 4 cycles in this example) if the first read operation 712 is targeted to "OD0" while the second read operation 714 is targeted to "OD1". Then the memory device "OD0" generates the read data 716 based on the read operation 712 while the memory device "OD1" generates the read data 718 based on the read operation 714 both at the same clock cycle "t6" of the "CLK" timing diagram. As is the case with conventional memory controllers, the memory controller 202 tracks the state of the banks in the memory chips, so that it can make sure the egress paths are unmodulated during the time slots where they will be needed later by optical memory devices 206 for output of return data.

As mentioned earlier, each read data bit driven onto the first optical interconnect 212, the clock channel 602 is toggled to indicate the correct position to sample the data by the memory controller 202. For example, both a rising edge 720 and a falling edge 722 of the clock channel 602 provide the timing to sample the read bit. The rising edge 720 and the falling edge 722 are centered within a data bit 724 of the first read data 716 and the second read data 718.

For illustrative purposes, the clock channel 602 is shown providing sample timing with both edges, although it is understood that the clock channel 602 may not be sampled by both edges. Also for illustrative purposes, the clock channel 602 is shown providing sample timing with the rising edge 720 and the falling edge 722 approximately at the centers of the data bit 724, although it is understood that the rising edge 720 and the falling edge 722 may be at different locations within the data bit 724 accounting for the circuit response time, such as setup time or hold time in the electrical domain, the optical domain, or a combination thereof.

Figure 8:
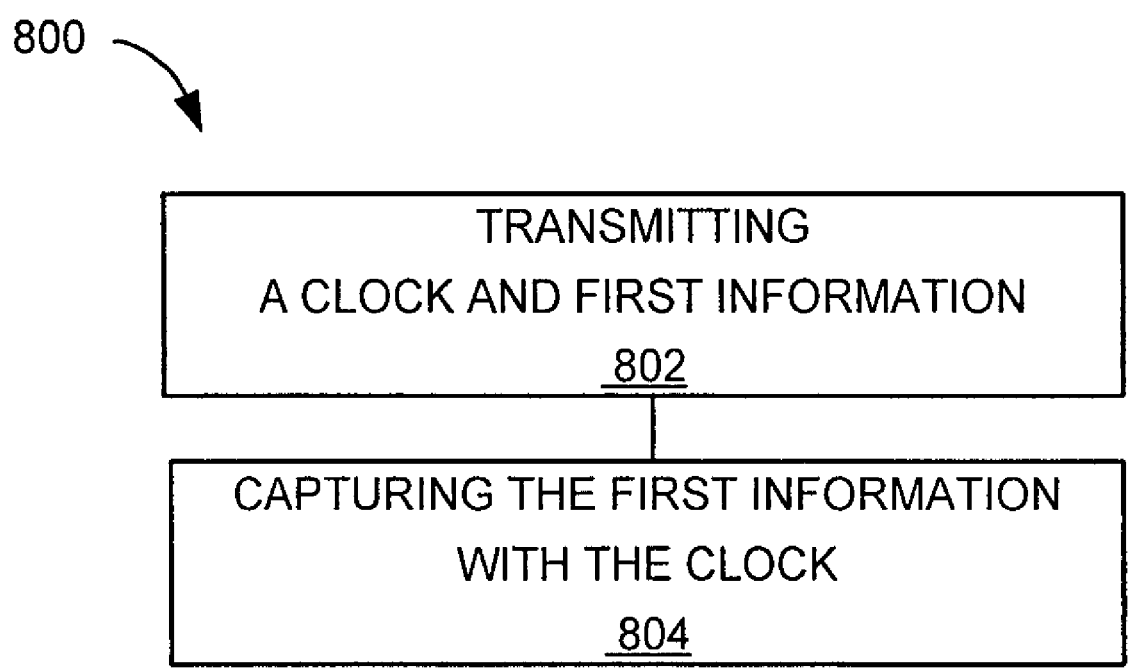
FIG. 8 is a flow chart of a method for communication between computer system components over an optical bus in accordance with a synchronous protocol in accordance with an embodiment of the present invention.

FIG. 8 is a flow chart of a method for communication between computer system components over an optical bus in accordance with a synchronous protocol in accordance with an embodiment of the present invention The method 800 comprises transmitting a clock and first information over an optical interconnect in a source synchronous optical protocol including: transmitting the clock over a clock channel of the optical interconnect, and transmitting the first information over a data channel of the optical interconnect with the clock channel and the data channel having equivalent path lengths in a block 802; and capturing the first information with the clock from the optical interconnect in a block 804.

In one aspect, the present invention provides the source synchronous optical protocol includes the memory devices driving the clock with associated read data allowing the memory controller to reliably sample and capture the ingress information.

In one aspect, the present invention provides the optical memory bus or optical interconnect for high bandwidth access to multiple memory devices. The bus-based arrangement reduces the amount of power required for the memory IO by avoiding the requirement for repeaters between memory devices.

While the invention has been described in conjunction with specific embodiments, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method for operating an optoelectronic system comprising:
   with a first device, transmitting a clock and first information over an optical interconnect in a source synchronous optical protocol including:
      transmitting the clock over a clock channel of the optical interconnect, and
      transmitting the first information over a data channel of the optical interconnect with the clock channel and the data channel having equivalent path lengths;
   with a second device connected to said optical interconnect, capturing the first information with the clock from the optical interconnect;
   with said second device, transmitting second information by modulating light over the data channel with an optical memory bus interface unit coupled with the optical interconnect and transmitting a return clock signal over the clock channel of the optical interconnect; and
   with said first device, capturing the second information using the return clock signal from the optical interconnect.

2. The method as claimed in claim 1 wherein transmitting the clock over the clock channel of the optical interconnect and transmitting the first information over the data channel includes transmitting the clock and the first information with different wavelengths over a single channel of the optical interconnect.

3. A method for operating an optoelectronic system comprising:
   transmitting a clock and first information over an optical interconnect in a source synchronous optical protocol including:
      transmitting the clock over a clock channel of the optical interconnect, and
      transmitting the first information over a data channel of the optical interconnect with the clock channel and the data channel having equivalent path lengths;
   capturing the first information with the clock from the optical interconnect including:
      transmitting second information by modulating light over the data channel with an optical memory bus interface unit coupled with the optical interconnect and based on the clock; and
   capturing the second information with the clock from the optical interconnect;
   wherein:
   transmitting the clock and the first information over the optical interconnect includes:
      transmitting from a controller to a first device and a second device all coupled to the optical interconnect with the first device between the controller and the second device;
      transmitting, from the controller, a third information after the time delta to the first information over the data channel;
   capturing the first information with the clock from the optical interconnect includes:
      capturing the first information with the second device;
   capturing the second information with the clock from the optical interconnect includes:
      capturing the second information from the second device with the controller; and
   further comprising:
      capturing the third information with the clock with the first device from the optical interconnect includes:
      generating, from the first device, fourth information with the third information through an optical modulator coupled to the data channel; and
      capturing the fourth information with the clock with the controller after the time delta to the second information.

4. A method for operating an optoelectronic system comprising:
   transmitting a clock and first information over an optical interconnect in a source synchronous optical protocol including:
      transmitting the clock over a clock channel of the optical interconnect, and
      transmitting the first information over a data channel of the optical interconnect with the clock channel and the data channel having equivalent path lengths;
   capturing the first information with the clock from the optical interconnect including:
      transmitting second information by modulating light over the data channel with an optical memory bus interface unit coupled with the optical interconnect and based on the clock; and
   capturing the second information with the clock from the optical interconnect;
   wherein:
   transmitting the clock and the first information over the optical interconnect includes:
      transmitting from a controller to a first device and a second device all coupled to the optical interconnect with the first device between the controller and the second device;
      transmitting, from the controller, a third information after the time delta to the first information over the data channel;
   capturing the first information with the clock from the optical interconnect includes:
      capturing the first information with the second device;
   capturing the second information with the clock from the optical interconnect includes:
      capturing the second information from the second device with the controller; and
   further comprising:
      passing the clock and the first information through the optical memory bus interface unit coupled with the first device.

5. A method for operating an optoelectronic system comprising:
   transmitting a clock and first information over an optical interconnect in a source synchronous optical protocol including:
      transmitting the clock over a clock channel of the optical interconnect, and
      transmitting the first information over a data channel of the optical interconnect with the clock channel and the data channel having equivalent path lengths;
   capturing the first information with the clock from the optical interconnect including:
      transmitting second information by modulating light over the data channel with an optical memory bus interface unit coupled with the optical interconnect and based on the clock; and
   capturing the second information with the clock from the optical interconnect;
   wherein:
   transmitting the clock and the first information over the optical interconnect includes:

transmitting a read operation from a controller to a memory device both coupled to the optical interconnect;
capturing the first information with the first clock from the optical interconnect includes:
capturing the read operation with the memory device; and
transmitting the second information over the data channel includes:
transmitting read data from the memory device.

6. A synchronous optical bus system for providing communication between optical system components comprising:
an optical interconnect having a clock channel and a data channel with the clock channel and the data channel having equivalent path lengths;
a controller coupled with the optical interconnect for broadcasting a clock over the clock channel and first information over the data channel in a source synchronous optical protocol; and
a device coupled with the optical interconnect for capturing the first information with the clock from the optical interconnect with the optical interconnect in a looped configuration from the controller to the device and back to the controller.

7. The system as claimed in claim 6 further comprising an optical memory bus interface unit coupled with the device for passing through the clock and the first information over the optical interconnect.

8. The system as claimed in claim 6 further comprising an optical modulator coupled with the device for transmitting second information from the device over the data channel by modulating light over the data channel and based on the clock.

9. The system as claimed in claim 6 wherein the controller coupled with the optical interconnect includes a controller photo-detector for capturing the second information with the clock from the optical interconnect.

10. The system as claimed in claim 6 wherein the controller coupled with the optical interconnect includes a controller light source for transmitting the first information having a command, data, or address.

11. A synchronous optical bus system for providing communication between optical system components comprising:
an optical interconnect having a clock channel and a data channel with the clock channel and the data channel having equivalent path lengths;
a controller coupled with the optical interconnect for broadcasting a clock over the clock channel and first information over the data channel in a source synchronous optical protocol;
a device coupled with the optical interconnect for capturing the first information with the clock from the optical interconnect with the optical interconnect in a looped configuration from the controller to the device and back to the controller; and
an optical memory bus interface unit coupled with the device and the optical interconnect for passing through or for modulating the first information over the optical interconnect;
wherein:
the optical memory bus interface unit includes:
an optical modulator for generating second information over the data channel by modulating light and based on the clock;
the controller includes:
a memory controller having a controller photo-detector for capturing the second information with the clock from the optical interconnect; and
the device includes:
a first memory device coupled with the optical memory bus interface unit.

12. The system as claimed in claim 11 wherein the optical interconnect includes the clock channel and the first information channel a single channel for transmitting the clock and the data with different wavelengths over the single channel.

13. The system as claimed in claim 11 further comprising:
a second memory device coupled with the optical interconnect with the first memory device between the memory controller and the second memory device; and
wherein:
the memory controller is coupled with the second memory device for transmitting third information after a time delta to the first information over the data channel including:
the second memory device for generating fourth information through the optical modulator, and
the memory controller for capturing the fourth information with the clock after the time delta to the second information.

14. The system as claimed in claim 11 further comprising:
a second memory device coupled with the optical interconnect with the first memory device between the controller and the second memory device; and
wherein:
the second memory device for capturing the first information with the first clock; and
the first memory device for passing the first clock and the first information through the optical memory bus interface unit coupled with the first device.

15. The system as claimed in claim 11 wherein:
the memory controller coupled with the first memory device for transmitting a read operation over the optical interconnect; and
the first memory device for capturing the read operation with the clock and for transmitting read data from the first memory device over the data channel.

* * * * *